Jan. 26, 1971  A. H. MOLOF  3,557,608

FLUID ANALYSIS SYSTEM

Filed Sept. 6, 1968

INVENTOR.
ALAN H. MOLOF

BY
Amster & Rothstein
ATTORNEYS

United States Patent Office
3,557,608
Patented Jan. 26, 1971

3,557,608
FLUID ANALYSIS SYSTEM
Alan H. Molof, 26 Roslyn Lane,
New City, N.Y. 10956
Filed Sept. 6, 1968, Ser. No. 758,089
Int. Cl. G01n 33/18
U.S. Cl. 73—53     4 Claims

ABSTRACT OF THE DISCLOSURE

A system for taking samples of a fluid and passing the same through a series of analytical stages without physically damaging the sample. A suction apparatus is provided at the discharge end of the system and is used as the motor force to draw a sample from the environment of the fluid through various analytical and operative stages during which the sample is analyzed.

---

The present invention relates generally to laboratory equipment and field and specifically to a system and means for taking samples of a fluid and analyzing the same.

In the analysis of fluids, it is desirable to continuously withdraw a sample, such as river water, from a source, such as a river, and analyze it under conditions in which the characteristics of the sample are not changed by the sampling process. In addition to the obvious requirements that the temperature and chemistry of the sample must be maintained, it has often been forgotten that the mechanical action of any positive displacement pump causes mechanical interruption, abrasion, shearing and excitement of the sample which, in some significant portion of samples examined, will produce an undependable or erroneous result. This is true for simple piston pumps, centrifugal pumps, turbine pumps and peristaltic pumps (of the type sold under the trademark Sigmamotor). For example, if a sample contains small particles in suspension which could be broken or disturbed by mechanical working, the characteristics of the sample could be and probably would be materially affected.

It is an object of the present invention to provide a motor force for movement of a sample through an analytical system which precludes any catastrophic mechanical interruption of the status quo. Specifically, it is an object of the present invention to provide a system in which the fluid specimens are drawn through the system by suction and that all the operations are performed prior to the time the liquid is directly subjected to the mechanical actions of a pump.

It is generally an object of the present invention to provide in a fluid analyzing system a suction pump at the discharge end of the system such that fluid is drawn by reduced pressure from the intake at the opposite end, through various operative stages and only thereafter is the fluid brought into contact with the motive force which draws the fluid through the system.

In accordance with one illustrative embodiment of the present invention there is provided a fluid analysis system including a plurality of stages at which various analytical steps are taken on a fluid sample such as addition of reagents, mixing, examination, analysis and recording and in which the fluid to be analyzed is drawn through the system by means of a vacuum means and is free from being subjected to any mechanical disturbances of a pump prior to being discharged from the system.

Figure 1:
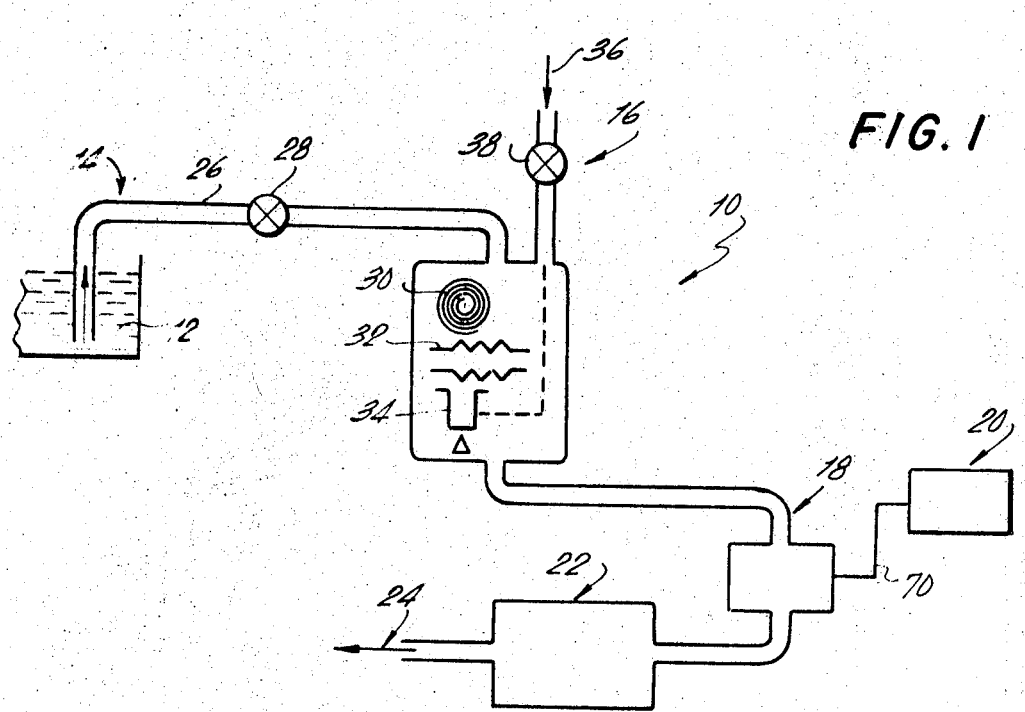
Figure 2:
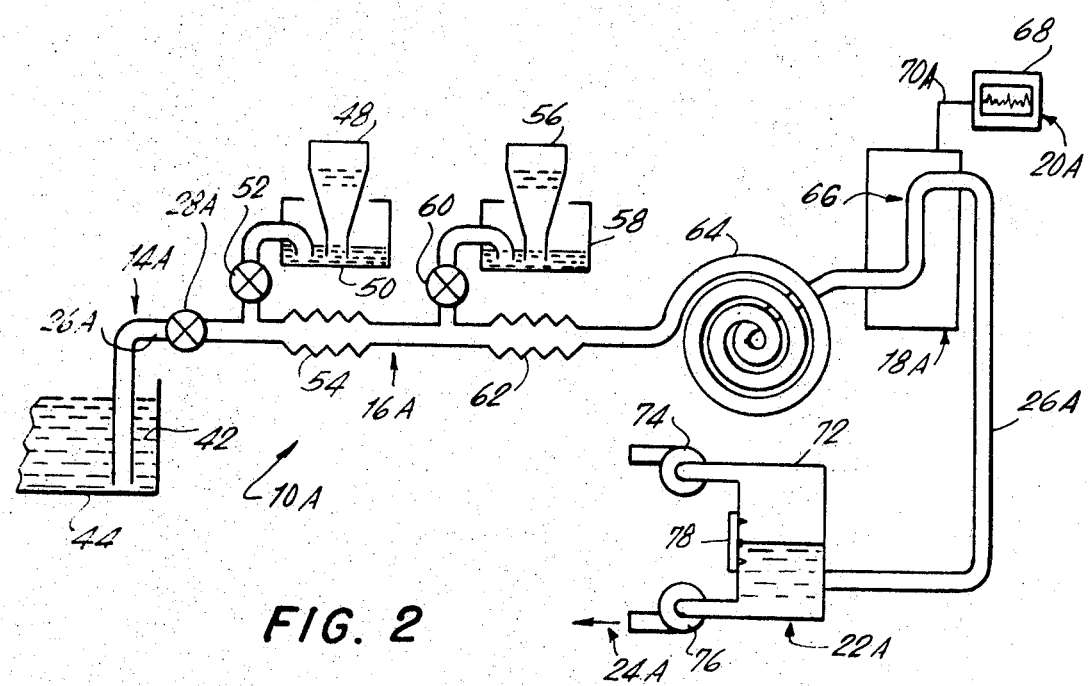

The invention will be best understood by reference to the following detailed description of presently preferred embodiments of the invention, when taken in conjunction with the accompanying drawings, wherein:

FIG. 1 is a schematic illustration of a basic analyzing system made in accordance with the present invention, and FIG. 2 is a somewhat more detailed schematic illustration of an analyzing system in accordance with the present invention shown set up for the analysis of orthophosphate in river water.

Referring first to FIG. 1, there is shown a fluid sampling and analyzing system generally designated by the numeral 10 for sampling and analyzing fluid material 12. Generally, the system 10 includes an intake or sampling station 14, a reagent additive and sample treatment station 16, a sensing station 18, a recording station 20, a reduced pressure motive force station 22 and a waste discharge station 24.

More specifically, the sample 12 may be a holding tank or a river which contains the fluid to be sampled. Appropriate piping 26 is used throughout the entire system. A sampling valve 28 is inserted into the fluid line 26 and, when open, allows the fluid 12 to be drawn by the reduced pressure motive source 22 from the river to the sample treatment station. At the sample treatment station 16, a variety of different treatment means may be applied for varying analytical purposes. For example, as shown in diagrammatic form in FIG. 1, there may be standard laboratory devices such as a holding tube 30, a mixing chamber 32 and a heating station 34. Also shown in the schematic at station 16 is an additive source 36 and an appropriate metering valve 38 for selectively introducing a reagent into the system for mixing with the sample 12. The schematic showing of the sample treatment station 16 in FIG. 1 should be understood to encompass everything from the simplest operation such as adding color indicators for determining pH to highly sophisticated chemical and biological treatment operations.

From the sample treatment station 16, the fluid travels through the piping 26 to the sensing station 18. At this station, there are provided those sensing elements necessary to determine the results of the operations performed at the treatment station 16. For example, a simple colorimeter would be used for determining pH or a flow meter for determining viscosity, etc. Cooperating with the equipment in the sensing station 18, and connected to it by a cable 70, is conventional continuous or intermittent recording equipment at the recording station 20.

The sample 12 is drawn through the various stations 14, 16 and 18 by a vacuum motive force applied at the reduced pressure motive force station 22. This station applies a negative pressure to the fluid to draw it evenly and smoothly, free from any mechanical abrasion, through the various stations. The force may be provided by a variety of different mechanical means, for example, a simple positive displacement discharge pump or a more sophisticated gas damped system (as described more fully below). Because of the motive force being applied to the fluid at the end of the system, rather than a positive force being applied at the beginning of the system, there is no significant mechanical action directly on the fluid before or while the fluid is being analyzed thereby reducing any error in analysis which might occur from such mechanical interference. The discharge from the reduced pressure motive force 22 at the waste discharge 24 is disposed of in any conventional manner.

In FIG. 2 there is shown a more specific example of the analytical sampling system 10 of FIG. 1. The system shown in FIG. 2 is generally labeled 10A. As in the system 10, there is an intake or sampling section 14A, an additive and sample treatment station 16A, a sensing station 18A, a recording station 20A, a reduced pressure motor force 22A and a waste discharge 24A.

A sample of fluid 42 is contained within a reservoir 44 which may either be a river bed or a gravity holding tank elevated above a river bed or some other source of fluid of which a sample is to be analyzed. Piping 26A leads through a sample intake valve 28A.

In the sample treatment station 16A there is located a first reagent bottle 48 which is inverted in a pan 50 which leads to a first reagent metering valve 52. As explained below, in an analysis of river water for orthophosphate, the first reagent would be sulfuric acid, potassium antimonyl tartrate, ammonium molybdate and ascorbic acid. A mixing chamber 54 is located in the tubing line 26A after the addition of the first reagent. Mixing is accomplished in a mixing chamber 54 by changes in the size of the stream path through which the sample fluid flows. The mixing chamber might be of many other types such as the fountain type or of the filter type or could be of any type of obstruction in which the fluid is diverted from its path and forced to mix with an additive.

Further downstream of the first reagent injection is a second bottle 56 containing a second reagent. It is inverted in a pan 58 from which piping leads to a second reagent metering valve 60 and then into the main flow of the fluid being tested. A second mixing chamber 62 is inserted into the flow path of the system. For the purposes of analyzing river water for orthophosphate, the second reagent would conveniently be alcohol which is mixed into the sample being tested and the first reagent by means of the second mixer 62.

At the final portion of the treatment station 16A, there is located a holding mechanism 64. In this case, the holding mechanism is simply a long continuous loop of tubing which, by its length and diameter, forms a holding area wherein the time the specimen is held is a function of the speed of movement of fluid through the entire system 10A. In the examination of river water for orthophosphate, after the addition of the first reagent and the second reagent, the mixture should be held for approximately 10 minutes for color development. The holding tubing 64 accomplishes this purpose.

In the sensing station 18A, there is provided a photometer 66 which reads the color of the sample and measures it in any manner known in the art for obtaining the desired information.

At the recording station 20A there are provided recording means 68 comprising a conventional continuous recording mechanism which is connected, by appropriate cable 70A, to the photometer 66 in the sensing station 18A. A continuous, periodic, or otherwise selective recordation of the reading of the photometer may be made at the recording station 20A.

The flow path for the fluid extends from the sensing station 18A to the reduced pressure motive force station 22A which serves to draw the fluid through the entire system 10A. In the showing of FIG. 2, the reduced pressure motive force 22A is shown as a chamber 72 which has a gas pump 74 active at its upper portion and a liquid discharge pump 76 connected to its lower portions. The connection with the tubing 26A forming the flow path of the sample fluid material is at a point below the maintained level of the liquid in the vessel 72. The pressure in the upper portion of vessel 72 is maintained at a desired reduced rate by the gas vacuum pump 74 and the level of the fluid in the vessel 72 is maintained by the liquid discharge pump 76. A control and sensing means 78 for the two pumps 74, 76 is associated with the vessel 72. It senses the level of fluid in the vessel 72 and turns on the liquid pump 76 when the liquid level gets too high and turns it off when the level is lowered to the desired point. Similarly, the sensing means 78 measures the pressure of the gas within the upper portion of the chamber 72 and controls the gas vacuum pump 74 to maintain pressure at the desired amount. Obviously, the level of pressure in the upper portions of the chamber 72 controls the rate of flow of liquid through the entire system 10A. The gas vacuum pump 74 is discharged into the atmosphere (or to suitable capture means if the fumes are noxious) and the liquid waste is discharged from the liquid discharge pump 76 to a suitable waste disposal location.

The operations of the system 10A shown in FIG. 2 will be best appreciated by following the flow of material through the system 10A and the following description of the process and the analytical process utilized. River water 42 is drawn into the system at the intake and sampling station 14A and an additive comprising sulfuric acid, potassium antimonyl tartrate, ammonium molybdate and ascorbic acid is added through the first reagent metering valve 52 and is mixed with the sample fluid in the mixing chamber 54. A second reagent through the second reagent metering valve 60 is then mixed with the sample and the first reagent in the second mixing chamber 62. The sample is then held in a holding circuit 64 for approximately ten minutes which is sufficient time for the development of color to enable the measurement of orthophosphate. The amount of orthophosphate is then read by the photometer in the sensing station 18A and the results obtained are continuously recorded at the recording station 20A. The fluids are continuously drawn through the system 10A by means of the motive force supplied at the reduced pressure station 22A. Since the force moving the fluid through the system is by means of a vacuum system at the end of the flow path, there is no direct mechanical action on the fluid prior to or at the point where it is being analytically examined. Thus, the system in accordance with the present invention eliminates the harmful effects which may be caused by such mechanical activity.

It should be appreciated that the disclosure made herein is of one generalized schematic form and one specific example utilizing the concept of the present invention. Design variations of the specific disclosures made herein can be easily made by those skilled in the art and the basic teachings herein may be used in other specific systems.

What is claimed is:

1. A liquid analysis system for continuously mixing a liquid sample with at least one reagent and for analyzing the mixture to measure selected characteristics of said sample comprising an intake station having fluid containing conduit means in communication with a body of liquid to be sampled for drawing a sample stream from said body of liquid, at least one reagent source having liquid carrying conduit means in communication with said reagent for drawing a reagent stream from said source, means defining at least one mixing station for combining said sample stream with said reagent stream, means defining a sensing station having sensing apparatus for determining selected characteristics of said combined sample and reagent streams, liquid conduit means interconnecting said stations and defining a flow path for liquid progressively through said stations, a reduced pressure suction pump operatively connected to said conduit means at a point in said system on the side of said mixing station away from said intake station for providing motor force for transporting and mixing said streams and a waste discharge for discharge of liquid analyzed in said system.

2. A liquid analysis system in accordance with claim 1 further including recording means operatively connected with said sensing means for recording said selective characteristics.

3. A liquid analysis system in accordance with claim 1 wherein a portion of said liquid conduit means on the side of said mixing station away from said intake station contains alternating contractions and expansions of cross-sectional area along said flow path to improve mixing.

4. A liquid analysis system in accordance with claim 1 wherein at least a portion of said liquid conduit means is heated so as to enhance the reaction between said sample and reagent streams.

(References on following page)

References Cited

UNITED STATES PATENTS

| | | | |
|---|---|---|---|
| 2,745,282 | 5/1956 | Rochon | 73—53X |
| 2,949,768 | 8/1960 | Ryant, Jr., et al. | 73—53 |
| 2,995,037 | 8/1961 | Parker et al. | 73—421 |
| 3,214,964 | 11/1965 | Davis | 73—53 |

FOREIGN PATENTS

| | | | |
|---|---|---|---|
| 954,189 | 4/1964 | Great Britain | 73—421 |
| 1,186,243 | 1/1965 | Germany | 73—53 |

LOUIS R. PRINCE, Primary Examiner

J. W. ROSKOS, Assistant Examiner